US012780061B2

(12) United States Patent
Conigliaro et al.

(10) Patent No.: US 12,780,061 B2
(45) Date of Patent: Nov. 3, 2026

(54) COCKPIT FOR A MOTOR VEHICLE AND METHOD FOR THE RECONFIGURATION OF A COCKPIT

(71) Applicant: FERRARI S.P.A., Modena (IT)

(72) Inventors: Vito Conigliaro, Modena (IT); Alessandro Paolo De Paoli, Modena (IT); Thomas Granjard, Modena (IT); Daniel Martin Taylor, Modena (IT)

(73) Assignee: FERRARI S.P.A., Modena (IT)

( * ) Notice: Subject to any disclaimer, the term of this patent is extended or adjusted under 35 U.S.C. 154(b) by 281 days.

(21) Appl. No.: 18/772,562

(22) Filed: Jul. 15, 2024

(65) Prior Publication Data

US 2025/0026253 A1 Jan. 23, 2025

(30) Foreign Application Priority Data

Jul. 20, 2023 (IT) ........................ 102023000015255

(51) Int. Cl.
*B60N 2/30* (2006.01)

(52) U.S. Cl.
CPC ......... *B60N 2/3065* (2013.01); *B60N 2/3027* (2013.01)

(58) Field of Classification Search
CPC ............................ B60N 2/3065; B60N 2/3027
See application file for complete search history.

(56) References Cited

U.S. PATENT DOCUMENTS 2,839,312 A * 6/1958 Barenyi .................. B62D 1/18 296/64
6,457,765 B1 * 10/2002 Bergquist .................. B64C 1/20 296/65.09

(Continued)

FOREIGN PATENT DOCUMENTS

DE 102005005511 A1 * 8/2006 ................ B60T 7/06
DE 102007010929 A1 * 9/2008 ........... B60N 2/3022

(Continued)

OTHER PUBLICATIONS

Italian Search Report in IT Application No. 202300015255, mailed Jan. 30, 2024, an English Translation attached hereto (6 pages).

*Primary Examiner* — Faye M Fleming
(74) *Attorney, Agent, or Firm* — Leason Ellis LLP

(57) ABSTRACT

A cockpit for a motor vehicle is described, comprising: a first seat comprising a first seat cushion and a first backrest; and a second seat comprising a second seat cushion and a second backrest; the cockpit can be shifted into a two-seater configuration, in which the first seat is in a first position, in which it is next to the second seat along a first axis and in which the second seat cushion and the second backrest are arranged in a second and a third position; the first seat can be moved along the first axis between the first position and a fourth position, the second seat cushion can be moved between the second position and a fifth position, and the second backrest can be moved between the third position and a sixth position parallel to a second axis, which is transverse to the first axis; the cockpit is selectively movable to a single-seater configuration, in which the first seat is in the fourth position, the second seat cushion is in the fifth position and the second backrest is in the sixth position; the first seat, in the fourth position, being arranged in the space occupied by the second seat when the cockpit is in said first configuration.

14 Claims, 3 Drawing Sheets

(56) References Cited

U.S. PATENT DOCUMENTS

| | | | | |
|---|---|---|---|---|
| 6,991,060 | B2 * | 1/2006 | Chernoff | B60N 2/14 297/344.21 |
| 8,944,380 | B2 * | 2/2015 | Ehlers | B64D 11/06 244/122 R |
| 10,065,711 | B2 * | 9/2018 | Fuller, IV | B60N 2/309 |
| 11,110,821 | B2 * | 9/2021 | Luchner | B60K 26/02 |
| 2016/0221472 | A1 * | 8/2016 | Deshmukh | B60N 2/01 |
| 2020/0254906 | A1 | 8/2020 | Luchner et al. | |
| 2025/0026249 | A1 * | 1/2025 | Conigliaro | B60N 2/01 |
| 2025/0026251 | A1 * | 1/2025 | Conigliaro | B60N 2/01 |

FOREIGN PATENT DOCUMENTS

| | | | | |
|---|---|---|---|---|
| DE | 102007062581 | A1 * | 6/2009 | B60N 2/0745 |
| EP | 1491431 | A1 | 12/2004 | |
| FR | 3108277 | A1 * | 9/2021 | B60N 2/3065 |

* cited by examiner

COCKPIT FOR A MOTOR VEHICLE AND METHOD FOR THE RECONFIGURATION OF A COCKPIT

CROSS-REFERENCE TO RELATED APPLICATIONS

This patent application claims priority from Italian patent application no. 102023000015255 filed on Jul. 20, 2023, the entire disclosure of which is incorporated herein by reference.

TECHNICAL FIELD

This invention relates to a cockpit for a motor vehicle and a method for reconfiguring the cockpit.

BACKGROUND

Motor vehicles comprise, in a known way:

a passenger compartment defining a body;

multiple wheels;

a steering wheel arranged inside the passenger compartment which can be driven by a driver to steer the front wheels and thus enable the motor vehicle to follow a curved trajectory; and pedals comprising an accelerator and a brake that the driver can activate to increase the drive torque or exert a braking torque on the wheels respectively, so as to control the speed of the motor vehicle.

The passenger compartments of motor vehicles normally intended for use on the road implement the so-called “two-seater” configuration.

In this “two-seater” configuration, the passenger compartment also comprises a pair of front seats intended to be occupied by a driver and a passenger respectively, and arranged next to each other along a transverse direction of the motor vehicle orthogonal to a longitudinal direction defining a normal forward direction of the motor vehicle.

The steering wheel and the pedals are located opposite the driver’s seat and are basically arranged in a left or right front corner of the vehicle.

With particular reference to sports motor vehicles, passenger compartments are known that implement the so-called “single-seater” configuration.

In this “single-seater” configuration, the passenger compartment comprises a single front seat arranged in a central position opposite the steering wheel and the pedals.

There is a need in the sector to provide motor vehicles that enable simple and easy reconfiguration between the above-mentioned “single-seater” and “two-seater” configurations.

SUMMARY

The purpose of this invention is to produce a cockpit, which makes it possible to meet the need mentioned above.

The above-mentioned purpose is achieved with this invention, as it relates to a cockpit as disclosed herein and defined in the claims.

This invention also relates to a method for reconfiguring a cockpit according to what is disclosed herein and defined in the claims.

BRIEF DESCRIPTION OF THE DRAWINGS

In order to better understand this invention, a non-limiting preferred embodiment thereof will now be described by way of example with reference to the accompanying drawings, in which.

DESCRIPTION OF EMBODIMENTS

Figure 1:
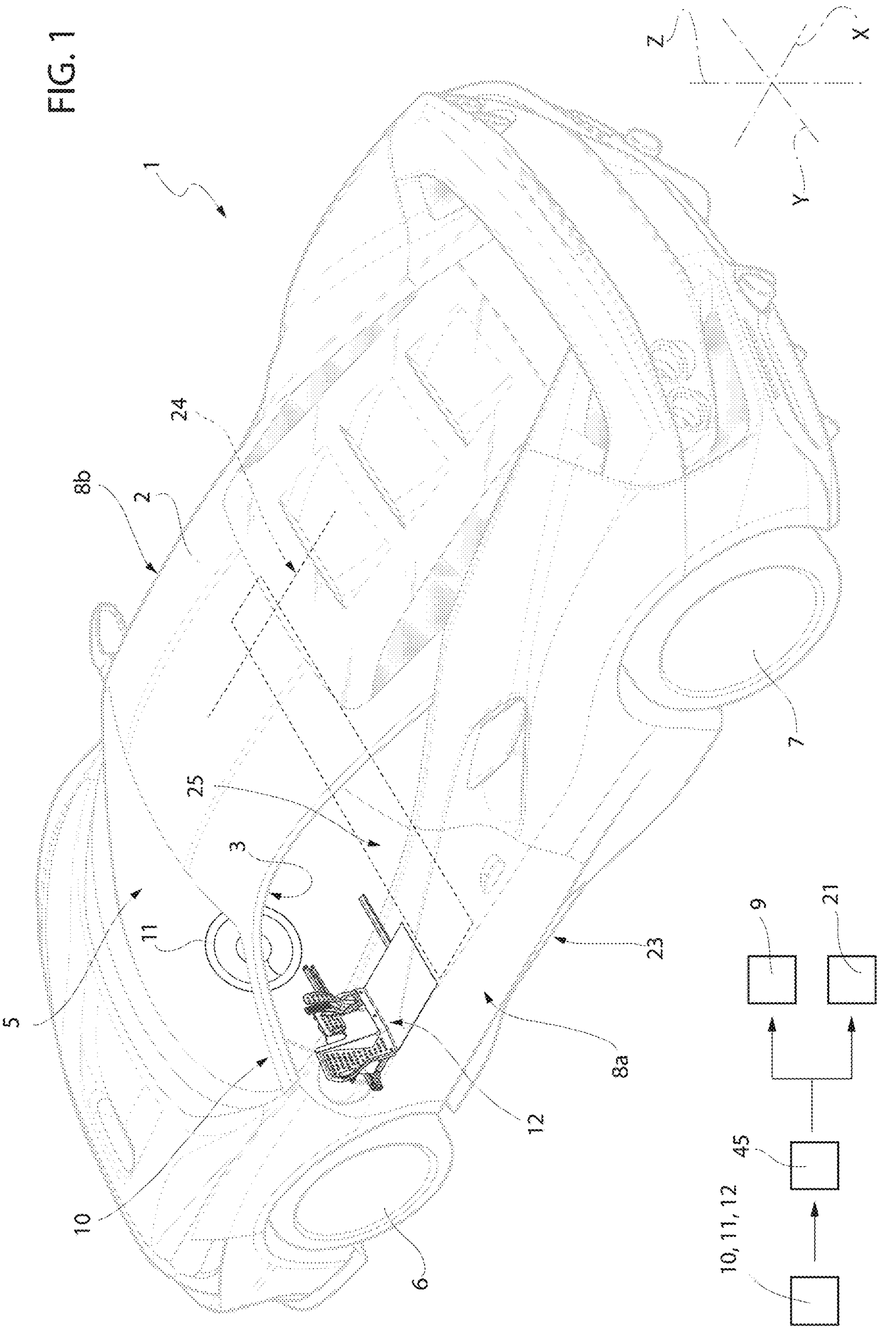
FIG. 1 is a perspective view of a motor vehicle comprising a first embodiment of a cockpit produced according to the precepts of this invention with parts removed for clarity.

With reference to FIG. 1, reference number 1 indicates a motor vehicle comprising a body 2 defining a passenger compartment 3.

It should be specified that, below in this description, expressions such as “above”, “below”, “in front of”, “behind” and the like are used with reference to the normal movement of the motor vehicle 1.

It is also possible to define:

a longitudinal axis X integral with the motor vehicle 1, arranged, in use, horizontal and parallel to a normal forward moving direction of the motor vehicle 1;

a transversal axis Y integral with the motor vehicle 1, arranged, in use, horizontal and orthogonal to the axis X; and an axis Z integral with the motor vehicle 1, arranged, in use, vertical and orthogonal to the axes X, Y.

The motor vehicle 1 also comprises (FIG. 1):

a pair of front wheels 6 and a pair of back wheels 7;

a known engine 9 only schematically illustrated in FIG. 1 and operationally connected to the wheels 6 and/or 7 to exert drive torque on the wheels 6 and/or 7; and a brake system 21, also only schematically illustrated, in FIG. 1 that can be driven to exert a braking torque on the wheels 6, 7.

The motor vehicle 1 also comprises (FIG. 1):

a windscreen 5 delimiting the passenger compartment 3 at the front; and a pair of doors 8*a*, 8*b* hinged to the body 2 that can be moved between a closed position wherein they delimit the passenger compartment 3 to the side and prevent entry into/exit from the passenger compartment 3 and an open position wherein they enable entry into/exit from the passenger compartment 3.

The body 2 also comprises a pair of door sills 23, 24 with longitudinal ends opposite each other. The door sills 23, 24 delimit the passenger compartment 3 and are adjacent to corresponding doors 8*a*, 8*b* when the doors 8*a*, 8*b* are in the respective closed positions.

The motor vehicle 1 also comprises control members 10 arranged in the passenger compartment 3 that the driver can activate to set a forward trajectory of the motor vehicle 1 with a desired speed.

In a known way, the control members 10 comprise:

a steering wheel 11 arranged inside the passenger compartment 3 that can be driven by the driver; and pedals 12 also arranged inside the passenger compartment 2 that the driver can activate.

The control members 10 are connected to the engine 9, to the brake system 21, and to the wheels 6 and/or 7 implementing a technology known in the sector as “drive by wire”.

In this description, the term "drive by wire" mode means that the steering wheel 11 does not have physical or mechanical connections with the wheels 6, 7.

The motor vehicle 1 also comprises a control unit 45 (FIG. 1) programmed to receive, as input, the actions requested at the steering wheel 11 and pedals 12 and to generate, as output, control signals for the engine 9 and the brake system 21.

The passenger compartment 3 houses a front cockpit 25, only schematically illustrated in FIG. 1, in a known way.

Figure 2:
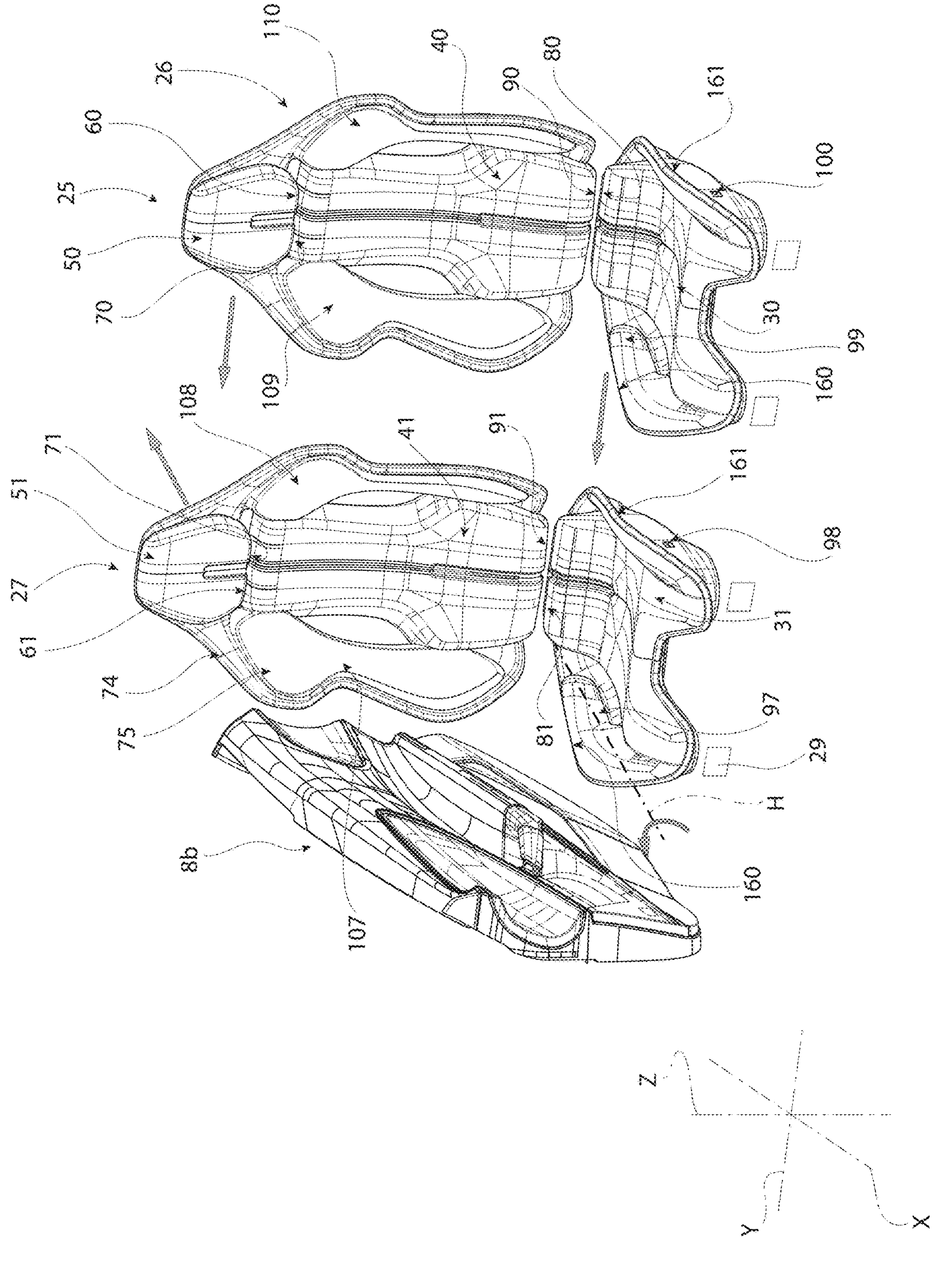
FIG. 2 is a perspective view on a very enlarged scale of the first embodiment of the cockpit in FIG. 1, with parts removed for clarity and in a first, “two-seater” operating configuration.
Figure 3:
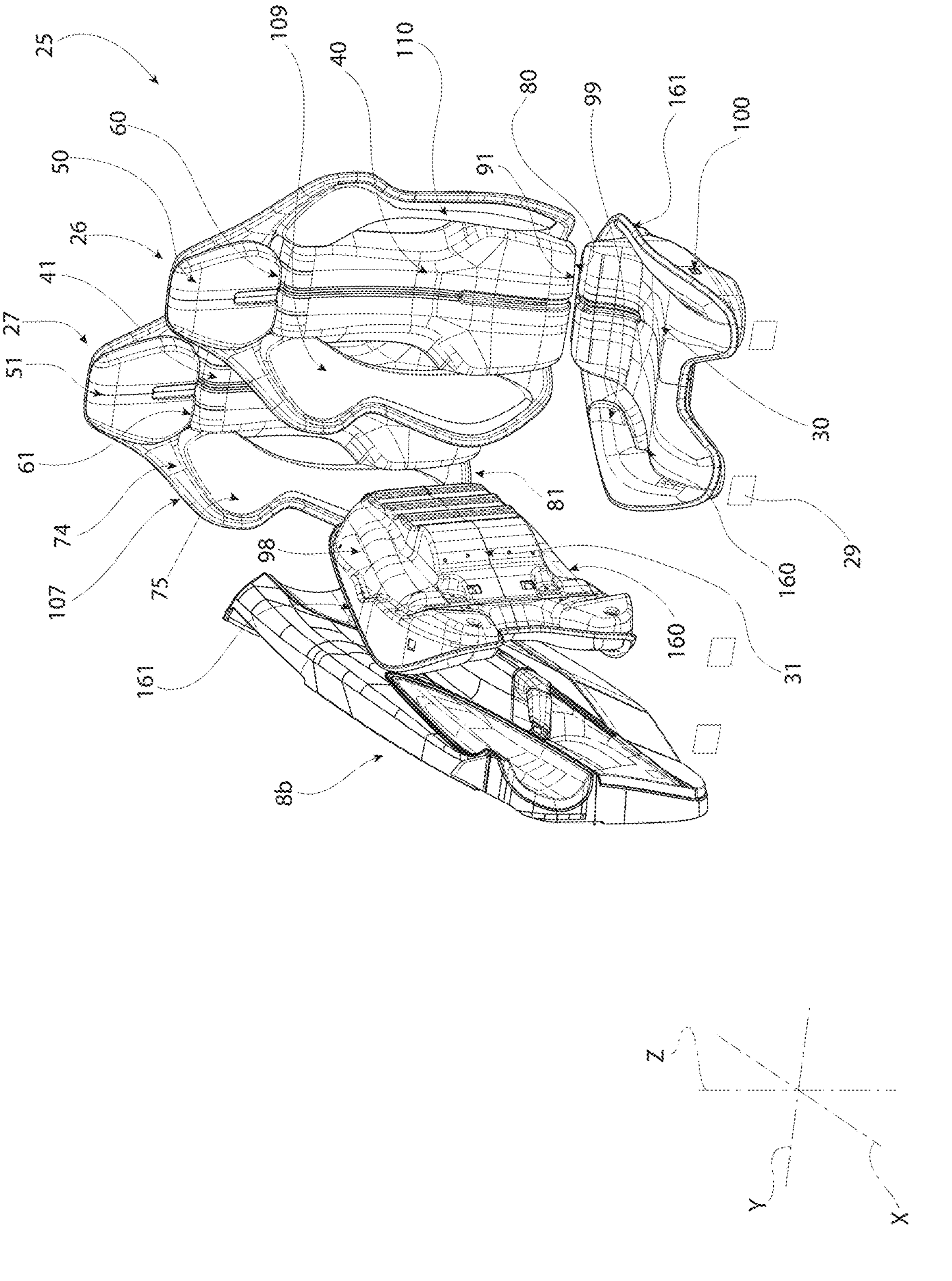
FIG. 3 is a perspective view on a very enlarged scale of the first embodiment of the cockpit in FIG. 2, with parts removed for clarity and in a second, “single-seater” operating configuration.

The cockpit 25 can be selectively moved between:

- a first "two-seater" configuration illustrated in FIG. 2, wherein it defines a seat 26 for a driver and a seat 27 for a passenger arranged next to each other and spaced apart parallel to the axis Y; and
- a "single-seater" configuration illustrated in FIG. 3, wherein the only seat 26 is available for the driver.

With particular reference to FIG. 2, the cockpit 25 also comprises a frame 29 (only schematically illustrated) fixed to the body 2.

With reference to the first, "two-seater" configuration illustrated in FIG. 2, the seats 26, 27 are next to each other parallel to the axis Y and each comprises:

- a respective seat cushion 30, 31;
- a respective backrest 40, 41; and
- a respective headrest 50, 51.

Each backrest 40, 41 comprises, in particular:

- a corresponding upper edge 60, 61 extended parallel to the axis Y and connected to a lower edge 70, 71 of the corresponding headrest 50, 51; and
- a corresponding lower edge 80, 81 extended parallel to the axis Y and connected to a rear and upper edge 90, 91 of the corresponding seat cushion 30, 31.

Each seat cushion 30, 31 comprises a corresponding pair of edges 160, 161 with opposite ends.

In the first, "two-seater" configuration of the cockpit 25, the edges 160, 161 are spaced apart parallel to the axis Y.

In particular, the edge 161 of the seat cushion 31 is interposed parallel to the axis Y between the edge 160 of the seat cushion 31 and the edge 160 of the other seat cushion 30.

The edge 160 of the seat cushion 30 is interposed parallel to the axis Y between the edge 161 of the seat cushion 31 and the edge 161 of the other seat cushion 30.

The edges 160, 161 of the respective seat cushions 30, 31 thus define respective horizontal planes orthogonal to the axis Z.

Each seat 26; 27 comprises, in addition:

- a pair of respective sides 97, 98; 99, 100 arranged on corresponding opposite sides of the corresponding seat cushion 30; 31; and
- a pair of respective sides 107, 108; 109, 110 arranged on corresponding opposite sides of the corresponding backrest 40; 41.

The sides 107, 108; 109, 110 each comprise a support 73 and a cushion 74 supported by the support 73.

In the first, "two-seater" configuration of the cockpit 25, the seats 26, 27 are arranged in respective first positions next to each other parallel to the axis Y.

In the above-mentioned first positions of the seats 26, 27, the seat cushion 31 and the backrest 41 of the seat 27 are also arranged in a second and third position respectively wherein they are next to each other parallel to the axis Y respectively to the seat cushion 30 and the backrest 40 of the seat 26.

Advantageously, the seat 26 can be moved parallel to the axis Y between the first position and a fourth position, the seat cushion 31 can be moved between the second position and a fifth position, and the backrest 41 can be moved between the third position and a sixth position parallel to the axis (X);

- the cockpit 25 is selectively movable to the second configuration, wherein the seat 26 is in the fourth position, the seat cushion 31 is in the fifth position, and the backrest 41 is in the sixth position;
- the seat 26, when arranged in the fourth position, occupies, at least partially, the space occupied by the seat 27 when the cockpit 25 is in the first, single-seater configuration.

More specifically, in the second, "single-seater" configuration of the cockpit 25, the seat 26 is arranged equally distant between the door sills 23, 24 parallel to the axis Y, and is intended to be occupied by the driver.

The seat cushion 30 and the backrest 40 of the seat 26 arranged in the fourth position occupy, at least partially, the respective spaces occupied by the seat cushion 31 and by the backrest 41 arranged in the respective second and third positions.

More specifically, the seat cushion 30 and the backrest of the seat 26 arranged in the fourth position occupy, at least partially, the respective spaces occupied in the first position.

More specifically, the seat 26 in the second position is in the position midway between the door sills 23, 24, i.e. at the same distance between the door sills 23, 24 parallel to the axis Y.

In the second, "single-seater" configuration, the seat cushion 31 is arranged facing the door 8*b* arranged in the respective closed position and has the edge 160 arranged below the edges 161. The seat cushion 31 extends on a plane basically vertical and orthogonal to the axis Y.

The edges 160, 161 of the seat cushion 31 are arranged at a first distance, in the example illustrated, measured parallel to the axis Y in the second, "single-seater" configuration of the cockpit 25 below a second distance measured parallel to the axis Y in the first, "two-seater" configuration of the cockpit 25.

The seat cushion 31 is arranged, in the fifth position, spaced apart from the seat 26, with reference to the axis Y.

The backrest 41 is arranged, in the sixth position, set back and spaced apart from the seat 26, with reference to a normal forward direction of the motor vehicle 1 parallel to the axis X.

In particular, in a view parallel to the axis X, the seat 26 at least partially overlaps the backrest 41 of the seat 27.

In a view parallel to the axis Y, the seat 26 at least partially overlaps the seat cushion 31 of the seat 27.

The transition of the cockpit 25 from the first to the second configuration and vice versa occurs thanks to:

- the translation of the backrest 41 of the seat 27 parallel to the axis X from the third position to the sixth position, which is more set back than the third position, with reference to the normal forward direction of the motor vehicle 1 parallel to the axis X;
- the rotation of the seat cushion 31 of the seat 27 around an axis H from the second position to the fourth position, so as to arrange the seat 27 in the second position; and
- the translation of the seat 26 parallel to the axis Y from the first position to the fourth position.

The axis H is parallel to the axis X in the example illustrated.

The transition of the cockpit 25 from the first to the second configuration, and vice versa, also occurs manually or by driving an actuator (not illustrated).

In the first, "two-seater" configuration of the cockpit 25, the seat 27 is arranged next to the door sill 24 and the seat 26 is arranged next to the door sill 23, thus implementing a left-hand drive mode of the motor vehicle 1.

In the second, "single-seater" configuration of the cockpit 25, the seat 26 in the second position is in the position midway between the door sills 23, 24, i.e. at the same distance between the door sills 23, 24 parallel to the axis Y.

In a way not described in detail since not necessary for this invention, the pedals 12 and the steering wheel 11 can be moved parallel to the axis Y to encourage the transformation of the motor vehicle 1 between the first and second configuration.

In particular, the pedals 12 and the steering wheel 11 may be moved parallel to the axis Y between:

a seventh position (FIG. 1) assumed when the cockpit 25 is in the first, "two-seater" configuration and wherein they face the seat 26; and an eighth position (not illustrated) assumed when the cockpit 25 is in the second, "single-seater" configuration and wherein they face the seat 27.

The pedals 12 and the steering wheel 11 are arranged adjacent to the door sill 23 when they are arranged in the seventh position. In this seventh position, a first distance between the pedals 12 and the steering wheel 11, and the door sill 23 is less than a second distance between the pedals 12 and the steering wheel 11, and the door sill 24. The above-mentioned first and second distance are measured parallel to the axis Y.

The pedals 12 and the steering wheel 11 are arranged in a position midway between the door sills 23, 24 when they are arranged in the eighth position. In this eighth position, the pedals 12 and the steering wheel 11 are equally spaced apart from the door sills 23, 24 parallel to the axis Y.

The operation of the cockpit 25 of the motor vehicle 1 is described starting from a condition wherein the cockpit 25 is in the first, "two-seater" configuration.

In this first, "two-seater" configuration, the seats 26, 27 are arranged in respective first positions and are intended to be occupied by the driver and the passenger respectively.

The seat 26 is interposed between the door sill 23 and the seat 27 and the seat 27 is interposed between the other seat 26 and the other door sill 24 parallel to the axis Y.

More specifically, the backrest 41 of the seat 27 is arranged in the third position and the seat cushion 31 of the seat 27 is arranged in the second position wherein the respective edges 160, 161 define a horizontal plane orthogonal to the axis Y.

The pedals 11 and the steering wheel 12 are arranged in the seventh position, wherein they face the seat 26 parallel to the axis X, to enable the driver to guide them.

If one wishes to reconfigure the motor vehicle 1, so as to arrange the cockpit 25 in the second, "single-seater" configuration, it is enough to drive the actuator so as to cause, sequentially:

the translation of the backrest 41 of the seat 27 parallel to the axis X from the third position to the sixth position, which is more set back than the first position;

the rotation of the seat cushion 31 of the seat 27 around the axis H from the second position to the fifth position, so as to arrange the seat 27 in the second position; and the translation of the seat 26 parallel to the axis Y from the first position to the fourth position.

At the end of the transition, the cockpit 25 is in the second configuration wherein:

the seat 26 in the second position is located in a position midway between the door sills 23, 24 occupying at least partially the space previously occupied by the seats 26, 27 arranged in the first position and can, thus, be occupied by the driver;

the backrest 41 in the sixth position is set back and offset in relation to the seat 26 parallel to the axis Y; and the seat cushion 31 is in the fourth position wherein the edges 160, 161 define a vertical plane, and is spaced apart from the seat 26 in the second position parallel to the axis Y.

The pedals 11 and the steering wheel 12 are also moved parallel to the axis Y, in a known way not illustrated, from the seventh position to the eighth position, wherein they face the seat 26 parallel to the axis X, to enable the driver to guide them.

If one wishes to reconfigure the motor vehicle 1, so as to rearrange the cockpit 25 in the second, "two-seater" configuration, it is enough to drive the actuator so as to cause, sequentially:

the translation of the seat 26 parallel to the axis Y from the fourth position to the first position;

the rotation of the seat cushion 31 of the seat 27 around the axis H from the fourth position to the fifth position; and the translation of the backrest 41 of the seat 27 parallel to the axis X from the sixth position to the third position so as to draw the edges 81 near the seat cushion 31, so as to arrange the seat 27 in the first position.

Irrespective of the fact that the cockpit 25 is in the first, "two-seater" configuration, or in the second, "single-seater" configuration, the control members 10 control the engine 9, the wheels 6, 7, and the brake system 21 implementing a technology known in the sector as "drive by wire".

The advantages enabled by this invention will be apparent from an examination thereof.

In particular, the cockpit 25 can be moved between the first, "two-seater" configuration wherein it defines the seat 26 for the driver and the other seat 27 for the passenger next to each other in the respective first positions, and the second, "single-seater" configuration wherein it defines only the seat 26 in the second position for the driver, simply by translating the seat 26 parallel to the axis Y, withdrawing the backrest 41 parallel to the axis X and rotating the seat cushion 31 around the axis H.

In this way, the motor vehicle 1 can be quickly and simply made more suitable for road use when the cockpit 25 assumes the first, "two-seater" configuration or sports use wherein the cockpit 25 assumes the second, "single-seater" configuration.

Finally, it is clear that changes may be made to the cockpit 25, and to the reconfiguration method implemented according to this invention, and variations produced thereto that, in any case, do not depart from the scope of protection defined by the claims.

In particular, in the first, "two-seater" configuration, the seat 26 for the driver could be arranged facing the door sill 24 and the seat 27 for the passenger could be arranged facing the other door sill 23, thus implementing a right-hand drive mode in the motor vehicle 1.

The invention claimed is:

1. A cockpit (25) for a motor vehicle (1), comprising:

a first seat (26) comprising, in turn, a first seat cushion (30) and a first backrest (40); and a second seat (27) comprising, in turn, a second seat cushion (31) and a second backrest (41);

said cockpit (25) being available in a first two-seater configuration, wherein said first seat (26) is in a first position, wherein it is next to said second seat (27) along a first axis (Y);

said second seat cushion (31) and said second backrest (41) being arranged in a second and a third position, respectively, when said cockpit (25) is in said first position;

characterized in that said first seat (26) can be moved along said first axis (Y) between said first position and a fourth position, said second seat cushion (31) can be moved between said second position and a fifth position and said second backrest (41) can be moved between said third position and a sixth position parallel to a second axis (X), which is transverse to said first axis (Y);

said cockpit (25) being selectively movable to a second single-seater configuration, wherein said first seat (26) is in said fourth position, said second seat cushion (31) is in said fifth position and said second backrest (41) is in said sixth position;

said first seat (26), in said fourth position, being at least partly arranged in the space occupied by said second seat (27) when said cockpit (25) is in said first configuration.

2. The cockpit according to claim 1, characterized in that said first seat cushion (30) of said first seat (26), in said fourth position, is at least partly arranged in the space occupied by said second seat cushion (31) arranged in said second position; and/or characterized in that said first backrest (40) of said first seat (26), in said fourth position, is at least partly arranged in the space occupied by said second backrest (41) arranged in said third position.

3. The cockpit according to claim 1, characterized in that said first seat (26) arranged in said fourth position at least partly overlaps said second backrest (41) arranged in said sixth position, in a view parallel to said second axis (X);

said second backrest (41) arranged in said sixth position being staggered along said first axis (Y) relative to said first seat (26) arranged in said second position; and/or characterized in that said first seat (26) arranged in said fourth position at least partly overlaps said second seat cushion (31) arranged in said fifth position, in a view parallel to said first axis (Y).

4. The cockpit according to claim 1, characterized in that said second seat cushion (31) can rotate around a third axis (H), which is parallel to said second axis (X), between said third and fourth positions.

5. The cockpit according to claim 4, characterized in that said second seat cushion (31) comprises a first and a second lateral end edges (160, 161) opposite one another;

said second edge (161) being interposed, along said first axis (Y), between said first edge (160) and said first seat (26) in said first configuration of said cockpit (25);

said second edge (161) being arranged at a first distance from said first edge (160) along said first axis (Y) in the first configuration and at a second distance, which is smaller than the first distance, from said first edge (160) along said first axis (Y) in said second configuration.

6. The cockpit according to claim 1, characterized in that said second axis (X) and said third axis (H) are parallel to one another; and/or characterized in that the first seat cushion (30) and said first backrest (40) can slide together in an integral manner parallel to said first axis (Y).

7. A motor vehicle (1) comprising:

a passenger compartment (3);

a plurality of driving members (10; 11, 12), which are housed inside said passenger compartment (3) and can be operated by a driver in order to control the trajectory and the speed of said motor vehicle (1);

at least one control member (6, 7, 9, 21) connected to at least one driving member (10; 11, 12) through a drive by wire mode; and said cockpit (25) according to claim 1.

8. The motor vehicle according to claim 7, characterized in that it further comprises:

a body (2);

a first and a second door (8*a*, 8*b*), which can be moved relative to said body (2) between respective seventh open positions, wherein they allow access to said passenger compartment (3), and respective eighth closed position, wherein they forbid access to said passenger compartment (3);

said second seat cushion (31) being interposed between said second door (8*b*) arranged in the respective eighth closed position and said first seat (26) arranged in said first position, when in it is arranged in said second position;

said second seat cushion (31) facing said second door (8*b*) arranged in the respective eighth closed position, when in it is arranged in said second position.

9. The motor vehicle according to claim 7, characterized in that said second backrest (41) is set back relative to said first seat (26) in said second configuration of the cockpit (25), with reference to a normal forward moving direction, in use, of said motor vehicle (1) parallel to said second axis (X).

10. A method for the configuration of a cockpit (25) for a motor vehicle (1), comprising the steps of:

i) arranging said cockpit (25) to a first two-seater configuration, wherein a first seat (26) is in a first position, wherein it is next to a second seat (27) along a first axis (Y);

said first seat (26) comprising, in turn, a first seat cushion (30) and a first backrest (40);

said second seat (27) comprising, in turn, a second seat cushion (31) and a second backrest (41);

said second seat cushion (31) and said second backrest (41) being arranged in a second and a third position, respectively, when said cockpit (25) is in said first position;

characterized in that it comprises the step ii) of shifting said cockpit (25) to a second single-seater configuration which said first seat (26) is in a fourth position, said second seat cushion (31) is in a fifth position and said second backrest (41) is in a sixth position;

said step ii) comprising the step iii) of placing at least part of said first seat (26) in the fourth position in the space occupied by said second seat (27) in said first configuration.

11. The method according to claim 10, characterized in that said step iii) comprises the steps of:

iv) at least partly placing said first seat cushion (30) of said first seat (26) in said fourth position in the space occupied by said second seat cushion (31) arranged in said second position; and/or v) at least partly placing said first backrest (40) of said first seat (26) in said fourth position in the space occupied by said second backrest (41) arranged in said third position.

12. The method according to claim 11, characterized in that said step ii) comprises the steps of:

vi) moving said second backrest (41) from said third position to said sixth position along a second axis (X) parallel to said first axis (Y);

vii) moving said second seat cushion (31) from said second position to said fifth position; and viii) moving said first seat (26) towards said second seat cushion (31) from said first position, parallel to said first axis (Y), up to said fourth position, wherein it is staggered, along said first axis (Y), relative to said second backrest (41) arranged in said sixth position.

13. The method according to claim 10, characterized in that said step viii) comprises the steps of:

ix) shifting said first seat (26) in said fourth position so that it at least partly overlaps said second backrest (41) arranged in said sixth position, in a view parallel to said second axis (X); and/or x) shifting said first seat (26) in said fourth position so that it at least partly overlaps said second seat cushion (31) arranged in said fifth position, in a view parallel to said first axis (Y).

14. The method according to claim 10, characterized in that said step vii) comprises the step xi) of rotating said second seat cushion (31) towards a door (8*b*) of said motor vehicle (1) until it faces said door (8*b*) in said second position of said second seat cushion (31) around a third axis (H) parallel to said second axis (X).

* * * * *